Patented Aug. 3, 1954

2,685,494

UNITED STATES PATENT OFFICE 2,685,494

DISPERSIBLE VAT DYE POWDER

Donald E. Marnon, Phillipsburg, N. J., assignor to General Aniline & Film Corporation, New York, N. Y., a corporation of Delaware No Drawing. Application April 25, 1950, Serial No. 158,073

1 Claim. (Cl. 8—34)

This invention relates to improved dye and pigment powders and to a method of preparing them. More particularly, it relates to such color powders containing water-insoluble dyes or colors, which powders are readily dispersible in water to yield stable colloidal dispersions. This application is a continuation-in-part of my application for Dispersible Dyestuff Powders, Serial No. 781,481, filed October 22, 1947, now abandoned.

Dispersible color powders of the type contemplated by this invention are especially valuable for preparing dye baths and pastes for coloring organic derivatives of cellulose, such as cellulose acetate, for the tinting of paper, buttons, rubber, and leather, and for pigment padding and textile printing. Various proposals have been made heretofore to incorporate finely divided water-insoluble dyes or pigments in compositions containing a wide variety of dispersing agents, protective colloids, and wetting agents for the formation of dye pastes or powders intended to yield colloidal suspensions of the color upon addition to water. Among the most frequently used dispersing agents and protective colloids that have been proposed are dextrin, gum arabic, and salts of lignin sulfonic acid.

It has now been discovered that a modified lignin sulfonic acid, which is identified as a partially desulfonated lignosulfonate which is substantially free from non-ligneous organic matter, acid-insoluble, and dispersible in alkaline solutions, can be used as the dispersing agent, alone or together with other dispersing agents, to produce dispersible dye powders having distinctive properties. This modified or partially desulfonated lignosulfonate is known as "Marasperse CB" and is obtained by the process of U. S. Patents 2,371,136 and 2,371,137. Briefly stated, this process consists in treating waste sulfite liquor with calcium hydroxide to precipitate basic calcium lignin sulfonate compounds, and dissolving the basic calcium lignin sulfonate compounds in an aqueous solution of sodium hydroxide. The amount of sodium hydroxide used is equivalent to about ½ the weight of the lignin. The solution is then heated from about 160° C. to 175° C. for ½ to 1½ hours at superatmospheric pressure to hydrolyze the lignin compounds and reduce the organically combined sulfur content to about ½ to ⅓ by weight of the original content. The solid content of the resulting solution is adjusted to about 20–28% total solid, and the resulting solution treated at a temperature of about 65° C. with carbondioxide gas, while the pH is within a range of 10.7 to 11.0. Precipitated calcium carbonate is filtered out and sulfuric acid added to reduce the pH to between 3 and 4, while maintaining the temperature at about 80–90° C. The lignin sulfonate compounds are precipitated and heated to about 95–98° C. to coagulate the product, which is filtered and washed with water until substantially all soluble impurities are removed.

The partially desulfonated sodiumlignosulfonate is equally effective as a dispersing agent in dispersible color powders containnig vat dyes, insoluble azo dyes, and metallized azo dyes, pigments such as carbon black, chrome green, and chrome yellow, and other insoluble coloring matters generally employed in dispersible color powders. As used herein, the word "color" is intended to include all such dyes and pigments. These dispersible color powders may be diluted or extended with solid, water-soluble, essentially non-hygroscopic, colorless, and inert compounds, such as sodium sulfate, dextrin, lactose, and sodium pyrophosphate, without impairing the dispersible qualities.

The dispersible color powders are prepared by mixing the insoluble color in finely divided form with the desired quantity of the partially desulfonated lignosulfonate and sufficient water to form a stiff paste. Alternatively, the dye or color in the form of its press cake as it is removed from the dye filter press is mixed with the desired quantity of the partially desulfonated lignosulfonate. Either of these mixtures is then placed in a powerful mixer such as a Werner-Pfleiderer, where the paste is subjected to a kneading action which not only effects uniform distribution of the ingredients, but in addition reduces the dyestuff particles to substantially colloidal dimensions as a result of the powerful shearing forces applied in such mixer. During this mixing, other solid ingredients as desired may be added. Additional dispersing agents or wetting agents, such as Tamol NNO, the sodium salt of formaldehydenaphthalene sulfonic acid, are generally incorporated into the composition, and if used are employed in smaller amounts than the partially desulfonated lignosulfonate. The contents of the mill or mixer are heated to evaporate the water, and milling is continued until the mass has been reduced to a very dry viscous state. If desired, evaporation of the water content can be deferred until the desired degree of comminution is first attained during the milling operation. The material is then oven dried at temperatures which will not melt or otherwise deleteriously affect the color, generally from 50 to 100° C. After drying, the extenders or diluents are added and the mixture is ground in a hammer mill.

The dispersible powders of this invention, as prepared from the partially desulfonated lignosulfonate as dispersing agent, although they take more water than conventional dispersions such as those obtained from dextrin and the sodium salt of the lignin sulfonic acids of U. S. Patent 2,090,511, or from gum arabic, will nevertheless produce a better milling mass. The obtainable degree of dispersion will also be superior to that of dye powders prepared with conventional dispersing agents and the dispersion will take place at a more rapid rate, generally in a ratio of 1 to 2. This property provides for increased production, since it does not tie up the equipment as long and enables the production of more batches per day in the same equipment than is possible with dye powders using the conventional dispersing agents. The dispersion effected by the use of the dispersible dye powders containing the partially desulfonated lignosulfonate dispersing agent does not filter out appreciably by known pigment filtering tests, and thus will perform more efficiently in standard dyeing operations, such as package dyeing and high speed continuous dyeing.

A particularly significant property of the new dispersible dye powders of this invention is the performance of the mass in the mill during dispersion. This performance is characterized by the fact that the milling mass stays down in the mill during the entire time of milling and does not ride up on the milling blades as shown by a constant draw of current through an ammeter on the line of the mill motor.

The preparation of the dispersible dye powders in accordance with this invention is illustrated by the following examples which are intended to be illustrative and not limitative of the scope of invention. The parts given are by weight.

Example 1

50 grams (as press cake) of the N-methyl derivative of Bzl' - benzanthronyl-1-aminoanthraquinone (U. S. P. 1,832,236) are introduced into a Werner-Pfleiderer mill, together with 40 grams of Marasperse CB (partially desulfonated lignosulfonate), and 10 grams of Tamol NNO (sodium salt of formaldehyde-naphthalene sulfonic acid). This mixture is blended and the water of the press cake gradually evaporated by circulating open steam through the Werner-Pfleiderer mill jacket until a viscous mass is obtained. This viscous mass is then milled for abou 1 hour, removed from the mill, and dried. The material is then cut to strength with suitable extending agents, such as sodium sulfate, hammer milled and tested. The resulting dispersible dye powder yields a colloidal dispersion of the dye on addition to water which gives superior performance in dyeing operations. It is suitable for use in preparing dye baths and printing pastes. Its performance is superior to that of conventional dispersions as determined by standard tests.

Example 2

50 grams (as press cake) of pyranthrone (C. I. 1096) are introduced into a Werner-Pfleiderer mill, together with 40 grams of Marasperse CB (partially desulfonated lignosulfonate) and 10 grams of Tamol NNO (sodium salt of formaldehyde-naphthalene sulfonic acid). This mixture is blended and the water of the press cake gradually evaporated by circulating open steam through the Werner-Pfleiderer mill jacket until a viscous mass is obtained. Milling of this viscous mass is continued for about 1 hour. It is then removed from the mill and dried. The product is then cut to desired strength with suitable diluents, such as dextrin, hammer milled and tested. The dispersible dye powder obtained in accordance with this example is readily dispersible in water, forming a colloidal dispersion which gives superior performance in dyeing operations. It has the same utility and similar properties to the product of Example 1.

Example 3

50 grams (as press cake) of 3,3'-dichloro-N-dihydro-1,2,1',2'-anthraquinonazine (C. I. 1113) are introduced into a Werner-Pfleiderer mill, together with 40 grams of Marasperse CB (partially desulfonated lignosulfonate) and 10 grams of Tamol NNO (sodium salt of formaldehyde-naphthalene sulfonic acid). This mixture is blended and the water of the press cake gradually evaporated by circulating open steam through the Werner-Pfleiderer mill jacket during evaporation until a viscous mass is obtained. Milling of this viscous mass is continued for about 1 hour and the product removed from the mill and dried. The dispersible dye powder thus obtained is then cut to desired strength by adding sodium sulfate and hammer milled. The powdered product is readily dispersible in water, forming a colloid dispersion which gives superior performance in dyeing operations. It has the same utility and superior dispersion properties as the product of Example 1.

Example 4

10 parts of the azo dye prepared by coupling the diazo of 1-amino-6-cyano-2,4-dinitrobenzene with N, N-dihydroxyethyl-m-toluidine (U. S. P. 2,156,446, Example 1) are mixed with 10 parts of Marasperse CB (partially desulfonated lignosulfonate) and 15 parts of water in a Werner-Pfleiderer mill. The mixture is blended in the mill to form a paste and the water is then gradually evaporated by circulating open steam through the Werner-Pfleiderer mill jacket during operation until a viscous mass is obtained. Milling of this viscous mass is continued for about 1 hour. It is then removed from the mill and dried. Four parts Nekal A (alkylnaphthalene sulfonic acid) and 8 parts sodium sulfate are added and the mixture is hammer milled. The despersed powder thus obtained is readily dispersible in water, forming a colloidal dispersion which is essentially stable to boiling conditions and hence eminently suitable for the dyeing of estron fibers. Because of the extreme fineness of the dispersion, better contact is obtained between the dye and the fiber, and more complete exhaust results.

Example 5

10 parts of 4 - methyl-2-hydroxy-4'-acetylamino azo benzene and 10 parts partially desulfonated sodium lignosulfonate are charged into a Werner-Pfleiderer mixer with 15 parts water and mixed to form a stiff paste. Mixing is then continued and the water gradually evaporated by circulating steam through the Werner-Pfleiderer mill jacket until a viscous mass is obtained. Milling of this viscous mass is continued for about 1 hour. It is then removed from the mill and dried. The product is then cut by adding 2.5 parts sodium sulfate, hammer milled and tested. The dispersible dye powder obtained in accordance with this example is readily dispersible in water, forming a colloidal dispersion which gives superior performance in dyeing operations. The results obtained are similar to those of the product of Example 4.

Dispersible dye powders yielding aqueous dispersions having similarly advantageous properties and suitable for dyeing organic derivatives of cellulose are obtained by substituting for the 10 parts of the azo dye of this example 10 parts of 4-nitro-2-chloro-4'-(N-ethyl-N-β-hydroxyethylamino) azo benzene and using 8 parts of sodium sulfate.

*Example 6*

50 grams of the acetate color, 1,4-diethylamino-5,8-dihydroxyanthraquinone are charged into a Werner-Pfleiderer mill together with 25 grams Marasperse CB (partially desulfonated sodium lignosulfonate), 22.5 grams Supra Spruce (lignin sulfonic acid sodium salt) and 2.5 parts soda ash. Sufficient water is added to this charge to provide a stiff paste milling mass. This mass is then milled in the Werner-Pfleiderer mill for about 1 hour, while the water content is gradually evaporated by circulating open steam through the Werner-Pfleiderer mill jacket. The product is then removed from the mill and dried, cut to desired strength by addition of sodium sulfate, and hammer milled. It is then tested and found to be a dispersible dye powder which is readily dispersible in water, forming a colloidal dispersion having the same properties as the products of Examples 4 and 5.

Dye powders yielding aqueous dispersions having similar advantageous properties and suitable for dyeing cellulose acetate fabrics are obtained by substituting for the anthraquinone dye of this example equal amounts of the acetate color 1-amino-4-hydroxy anthraquinone in one instance and 1-amino-4-methylamino anthraquinone in another.

Variations can be made in the preparation of the dispersible dyestuff compositions of the foregoing examples without departing from the spirit of the invention. Thus, other water-insoluble organic dyestuffs or pigments and insoluble dyes for the dyeing of organic derivatives of cellulose can be substituted for the dyes of these examples. The preparations of the ingredients can be varied within desired limits. The kneading operation can be carried out in any milling or mixing equipment sufficiently powerful to subject the dye paste to a strong shearing action. Excess water, if present initially during the mixing operation, can be evaporated during the kneading so as to form the stiff paste required for the mixing operation. If desired, the initial mixing operation can be carried out with only slow evaporation of water until the dyestuff is sufficiently comminuted and the water can then be removed in a second stage of the mixing process. Other variations and modifications, which will be obvious to those skilled in the art, can be made in the process of this invention without departing from the scope or nature thereof.

I claim:

A water-dispersible color powder containing a water-insoluble vat dye in the form of colloidally-dispersible particles and a dispersing medium consisting of a mixture of 10 parts of the sodium salt of formaldehyde-naphthalene sulfonic acid and 40 parts of a partially desulfonated lignosulfonate which is substantially free from non-ligneous organic matter and is acid-insoluble, and dispersible in alkaline solutions.

References Cited in the file of this patent

UNITED STATES PATENTS

| Number | Name | Date |
|---|---|---|
| 1,828,592 | Bommer | Oct. 20, 1931 |
| 2,090,511 | Crossley | Aug. 17, 1937 |
| 2,371,136 | Harmon | Mar. 13, 1945 |